(12) United States Patent
Hamel et al.

(10) Patent No.: US 11,584,549 B2
(45) Date of Patent: Feb. 21, 2023

(54) METHODS AND SYSTEMS FOR ASSESSING FUEL BURN LEVELS IN AIRCRAFT

(71) Applicant: Airbus Canada Managing GP Inc., Quebec (CA)

(72) Inventors: Remi Hamel, Quebec (CA); Corentin Sainmont, Quebec (CA); Marc Olivier Lapointe, Quebec (CA)

(73) Assignee: AIRBUS CANADA MANAGING GP INC., Mirabel (CA)

( * ) Notice: Subject to any disclaimer, the term of this patent is extended or adjusted under 35 U.S.C. 154(b) by 198 days.

(21) Appl. No.: 16/957,741

(22) PCT Filed: Dec. 19, 2018

(86) PCT No.: PCT/CA2018/051623
§ 371 (c)(1),
(2) Date: Jun. 25, 2020

(87) PCT Pub. No.: WO2019/126868
PCT Pub. Date: Jul. 4, 2019

(65) Prior Publication Data
US 2020/0331637 A1  Oct. 22, 2020

Related U.S. Application Data

(60) Provisional application No. 62/610,663, filed on Dec. 27, 2017.

(51) Int. Cl.
*B64F 5/60* (2017.01)
*B64D 43/00* (2006.01)
*G07C 5/08* (2006.01)

(52) U.S. Cl.
CPC ............. *B64F 5/60* (2017.01); *B64D 43/00* (2013.01); *G07C 5/0808* (2013.01); *G07C 5/0825* (2013.01)

(58) Field of Classification Search
CPC ....... B64F 5/60; B64D 43/00; B64D 11/0015; B64D 2013/0603; B64D 2221/00;
(Continued)

(56) References Cited

U.S. PATENT DOCUMENTS

| 4,262,495 A | 4/1981 | Gupta et al. |
| 2009/0112377 A1* | 4/2009 | Schalla .................. G06Q 50/12 705/15 |

(Continued)

OTHER PUBLICATIONS

International Search Report; priority document.
(Continued)

*Primary Examiner* — Joseph J Dallo
(74) *Attorney, Agent, or Firm* — Greer, Burns & Crain, Ltd.

(57) ABSTRACT

Herein provided are methods and systems for assessing a fuel burn level of an aircraft for a planned mission. Flight information relating to the planned mission is obtained via a graphical user interface, the flight information comprising configurable number of passengers for the aircraft. A requisite engine bleed level for the planned mission is determined based on the flight information. The fuel burn level is assessed based on the requisite engine bleed level.

20 Claims, 5 Drawing Sheets

(58) Field of Classification Search
CPC .. B64D 37/005; G07C 5/0808; G07C 5/0825; G06Q 50/30; G06Q 10/04
See application file for complete search history.

(56) References Cited

U.S. PATENT DOCUMENTS

2010/0076672 A1   3/2010  Cremers
2016/0236790 A1*  8/2016  Knapp ................. G08G 5/0021

OTHER PUBLICATIONS

Gogo LLC, "The anatomy of inflight connectivity" 2014.
Dollmayer et al., "Consideration of Fuel Consumption Caused by Aircraft Systems in Aircraft Design," 25th International Congress of the Aeronautical Sciences, Sep. 8, 2016.
Evans, "The Effects of Compressor Seventh-Stage Bleed Air Extraction on Performance of the F1 00-PW-220 Afterburning Turbofan Engine," National Aeronautics and Space Adminstration, NASA Contractor Report 179447, Feb. 1991.

* cited by examiner

METHODS AND SYSTEMS FOR ASSESSING FUEL BURN LEVELS IN AIRCRAFT

CROSS-REFERENCE TO RELATED APPLICATIONS

This application claims the benefit of the International Application No. PCT/CA2018/051623, filed on Dec. 19, 2018, and of the U.S. Provisional Application No. 62/610,663 filed on Dec. 27, 2017, the entire disclosures of which are hereby incorporated by reference.

FIELD OF THE INVENTION

The present disclosure relates generally to aircraft, and more specifically to assessment of fuel burn levels in aircraft.

BACKGROUND OF THE INVENTION

In preparation for a flight mission, flight operations personnel must make various preparations to ensure proper and safe operation of an aircraft. One such verification is ensuring that the aircraft is provided with sufficient fuel for the flight mission, including to meet various regulatory standards for reserve fuel. When determining the requisite fuel for the flight mission, flight operations personnel use a variety of assumptions about the path the aircraft will take, the weight the aircraft will be carrying, the amount of auxiliary power the engine will need to provide, and the like. The requisite fuel amount is sometimes referred to as a "fuel burn" for the flight mission.

Existing approaches at estimating or predicting fuel burn traditionally rely on broad-stroke assumptions. For instance, the flight operations personnel may assume that the aircraft will be at full capacity, that the bleed air extraction system will be fully operational, that all non-optional and optional electrical systems of the aircraft will be operational, that optional aircraft attachments that influence air drag are to be used, and the like. However, these broad-stroke assumptions are often inaccurate or overly conservative, causing fuel burn assessments to overestimate the amount of fuel required for the flight mission. In addition, since more fuel is required in order to carry more fuel, compounded overestimation occurs, resulting in larger fuel waste and increased operating costs.

As such, there is room for improvement.

SUMMARY OF THE INVENTION

In accordance with a broad aspect, there is provided a method for assessing a fuel burn level of an aircraft for a planned mission. Flight information relating to the planned mission is obtained via a graphical user interface, the flight information comprising a configurable number of passengers for the aircraft. A requisite engine bleed level for the planned mission is determined based on the flight information. The fuel burn level is assessed based on the requisite engine bleed level.

In some embodiments, the flight information further comprises a cargo heat status indicator, and determining the requisite engine bleed level is further based on the cargo heat status indicator.

In some embodiments, the flight information further comprises an in-flight entertainment status indicator, the method further comprising determining, based on the in-flight entertainment status indicator, an electrical load for the planned mission, and wherein assessing the fuel burn level is further based on the electrical load.

In some embodiments, the flight information further comprises a lighting status indicator, and determining the electrical load is further based on the lighting status indicator.

In some embodiments, the flight information further comprises an antenna status indicator, the method further comprising determining, based on the antenna status indicator, a supplementary drag factor, and wherein assessing the fuel burn level is further based on the supplementary drag factor.

In some embodiments, determining the electrical load is further based on the antenna status indicator.

In some embodiments, the antenna status indicator is indicative of an antenna model.

In some embodiments, the flight information further comprises a galley status indicator, and determining the electrical load is further based on the galley status indicator.

In some embodiments, the galley status indicator is indicative of a galley of the aircraft being one of high-energy and low-energy.

In some embodiments, obtaining flight information via the graphical user interface comprises receiving an input via at least one entry element of the graphical user interface.

In some embodiments, obtaining flight information comprising the configurable number of passengers for the aircraft comprises obtaining a number of passengers onboard the aircraft.

In some embodiments, obtaining flight information comprising the configurable number of passengers for the aircraft comprises estimating a number of passengers based on one of a number of booked passengers and a number of checked-in passengers.

In some embodiments, obtaining flight information comprising the configurable number of passengers for the aircraft comprises providing a number of passengers based on one of a seating configuration and a model of the aircraft.

In accordance with another broad aspect, there is provided a system for assessing a fuel burn level of an aircraft for a planned mission, comprising a processing unit and a non-transitory computer-readable medium communicatively coupled to the processing unit. The computer-readable medium comprises computer-readable program instructions executable by the processing unit for: obtaining flight information relating to the planned mission via a graphical user interface, the flight information comprising a configurable number of passengers for the aircraft; determining, based on the flight information, a requisite engine bleed level for the planned mission; and assessing the fuel burn level based on the requisite engine bleed level.

In some embodiments, the flight information further comprises a cargo heat status indicator, and wherein determining the requisite engine bleed level is further based on the cargo heat status indicator.

In some embodiments, the flight information further comprises an in-flight entertainment status indicator, the program instructions being further executable for determining, based on the in-flight entertainment status indicator, an electrical load for the planned mission, and assessing the fuel burn level is further based on the electrical load.

In some embodiments, the flight information further comprises a lighting status indicator, and determining the electrical load is further based on the lighting status indicator.

In some embodiments, the flight information further comprises an antenna status indicator, the program instructions being further executable for determining, based on the antenna status indicator, a supplementary drag factor, and assessing the fuel burn level is further based on the supplementary drag factor.

In some embodiments, determining the electrical load is further based on the antenna status indicator.

In some embodiments, the antenna status indicator is indicative of an antenna model.

In some embodiments, the flight information further comprises a galley status indicator, and determining the electrical load is further based on the galley status indicator.

In some embodiments, the galley status indicator is indicative of a galley of the aircraft being one of high-energy and low-energy.

In some embodiments, obtaining flight information via the graphical user interface comprises receiving an input via at least one entry element of the graphical user interface.

In some embodiments, obtaining flight information comprising the configurable number of passengers for the aircraft comprises obtaining a number of passengers onboard the aircraft.

In some embodiments, obtaining flight information comprising the configurable number of passengers for the aircraft comprises estimating a number of passengers based on one of a number of booked passengers and a number of checked-in passengers.

In some embodiments, obtaining flight information comprising the configurable number of passengers for the aircraft comprises providing a number of passengers based on one of a seating configuration and a model of the aircraft.

In accordance with another broad aspect, there is provided a method for assessing a fuel burn level of an aircraft for a planned mission. Flight information relating to the planned mission is obtained via a graphical user interface, the flight information comprising at least one of an in-flight entertainment status indicator, an antenna status indicator, a lighting status indicator, and a galley status indicator. An electrical load for the planned mission is determined based on the flight information. The fuel burn level is assessed based on the electrical load.

In accordance with another broad aspect, there is provided a system for assessing a fuel burn level of an aircraft for a planned mission, comprising a processing unit and a non-transitory computer-readable medium communicatively coupled to the processing unit. The computer-readable medium comprises computer-readable program instructions executable by the processing unit for: obtaining flight information relating to the planned mission via a graphical user interface, the flight information comprising at least one of an in-flight entertainment status indicator, an antenna status indicator, a lighting status indicator, and a galley status indicator; determining, based on the flight information, an electrical load for the planned mission; and assessing the fuel burn level based on the electrical load.

In accordance with another broad aspect, there is provided a method for assessing a fuel burn level of an aircraft for a planned mission. Flight information relating to the planned mission is obtained via a graphical user interface, the flight information comprising an antenna status indicator. A supplementary drag factor for the planned mission is determined based on the flight information. The fuel burn level is assessed based on the supplementary drag factor.

In accordance with another broad aspect, there is provided a system for assessing a fuel burn level of an aircraft for a planned mission, comprising a processing unit; and a non-transitory computer-readable medium communicatively coupled to the processing unit. The computer-readable medium comprises computer-readable program instructions executable by the processing unit for: obtaining flight information relating to the planned mission via a graphical user interface, the flight information comprising an antenna status indicator; determining, based on the flight information, a supplementary drag factor for the planned mission; and assessing the fuel burn level based on the supplementary drag factor.

In accordance with a further broad aspect, there is provided a graphical user interface for use in assessing a fuel burn level of an aircraft for a planned mission, comprising: a numeral entry element disposed in a first portion of the graphical user interface and configured to receive a configurable number of passengers for the aircraft. The graphical user interface is configured for communicating the configurable number of passengers for the aircraft to a fuel burn optimization module for use in determining a requisite engine bleed level for the planned mission.

In some embodiments, the graphical user interface further comprises at least one status indicator entry element disposed in a second portion of the graphical user interface and configured to receive supplementary flight information comprising at least one of a cargo heat status, an in-flight entertainment status, an antenna status, a lighting status, and a galley status.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Because each unit of fuel adds weight to the aircraft, and thus increases the requisite fuel for the aircraft to complete a flight mission, obtaining accurate fuel burn assessments can help flight operations personnel reduce costs and environmental impacts associated with flight missions undertaken by aircraft. In addition, more accurate fuel burn assessments can permit the aircraft to add more passengers (i.e., since the weight of excess fuel that would have been put on board the aircraft can be replaced by passengers), or can allow the aircraft to provide an increased range. More accurate fuel burn assessments can be obtained by using more precise assumptions or information about the operating conditions of the aircraft.

Figure 1:
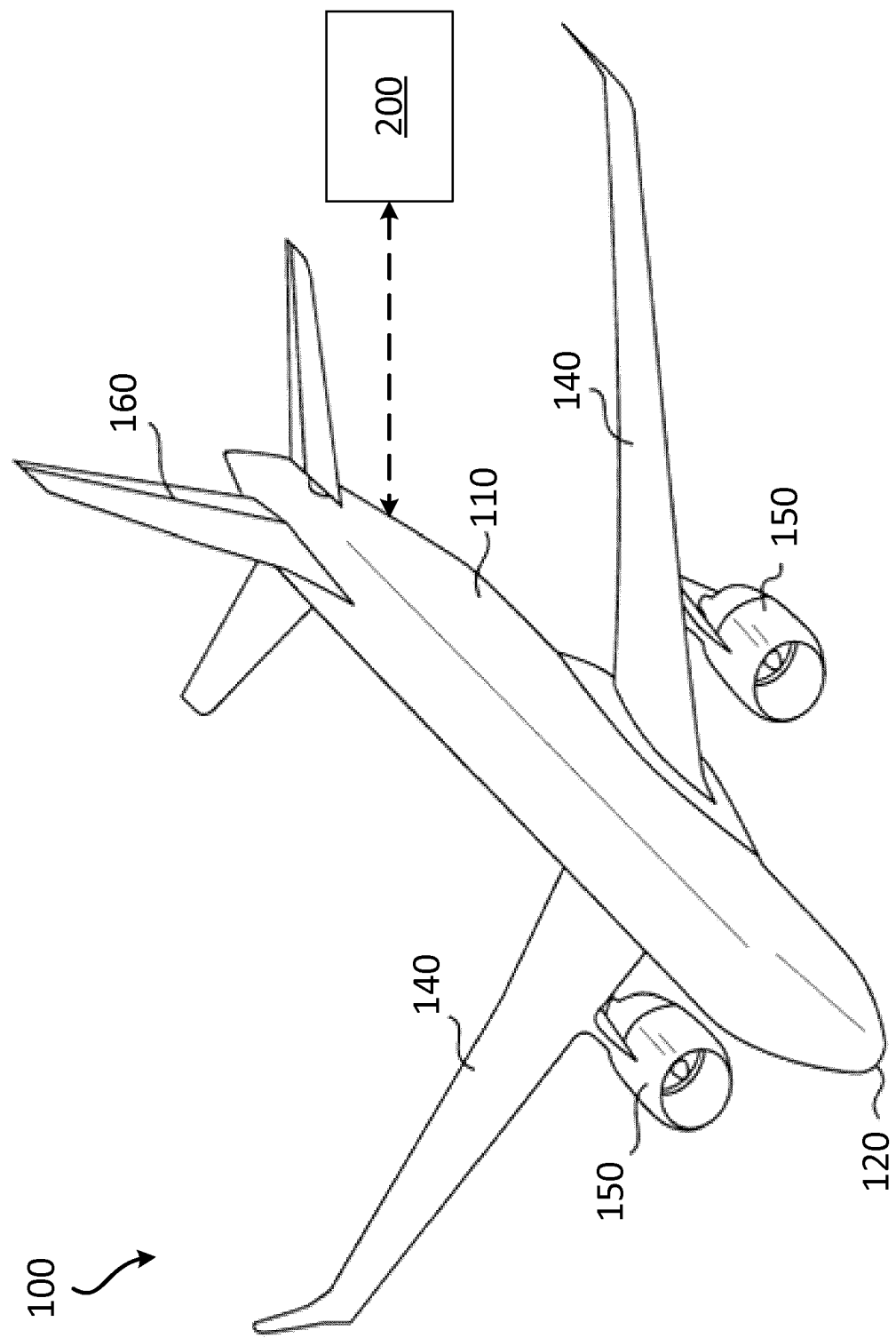
FIG. 1 is a diagram of an example aircraft and an example control system for the example aircraft.

With reference to FIG. 1, an aircraft 100, having a fuselage 110, is equipped with a pair of wings 140 (or more), engines 150, and a tail 160. The aircraft 100 may be any suitable aircraft such as corporate, private, commercial or any other type of aircraft. For example, the aircraft 100 may be a narrow-body, twin engine jet airliner. The aircraft 100 may be a fixed wing or a rotary wing aircraft. The fuselage 110 has a cockpit 120, which can be positioned at any suitable location on the aircraft 100, for example at a front portion of the fuselage 110. The cockpit 120 is configured for accommodating one or more pilots who control the aircraft 100 by way of one or more operator controls. The operator controls can include any suitable number of pedals, yokes, steering wheels, center sticks, flight sticks, levers, knobs, switches, and the like. Although two engines 150 are illustrated, it should be understood that the aircraft 100 can have any suitable number of engines.

Additionally, according to the present disclosure, a control system 200 is provided for assessing a fuel burn level for the aircraft 100 for a given mission. The control system 200 can be located off-board of the aircraft 100 and used by flight operations personnel to determine appropriate fueling requirements for the aircraft 100 for a given mission. Alternatively, or in addition, part or all of the control system 200 can be located onboard the aircraft 100.

The control system 200 can include any suitable number of computer elements, telecommunication elements, processing elements, sensor elements, and the like. In some embodiments, the control system 200 includes a terminal through which flight operations personnel can perform entry of various flight information and a processing unit configured to perform various calculations based on the flight information input via the terminal. Other embodiments of the control system 200 are considered. In some embodiments, the aircraft 100 can be communicatively coupled to the control system 200. For example, the control system 200 is configured for communicating with the aircraft 100 in any suitable fashion, via wired and/or wireless protocols, to provide information regarding the fuel burn level for the aircraft 100. In other embodiments, the control system 200 operates independently from the aircraft 100, for instance to assess the fuel burn level for the aircraft 100 and thus the fueling requirements for the aircraft 100 for a given mission. Flight operations personnel can then use the fueling requirements to determine, for example, an amount of fuel to load onto the aircraft.

Figure 2:
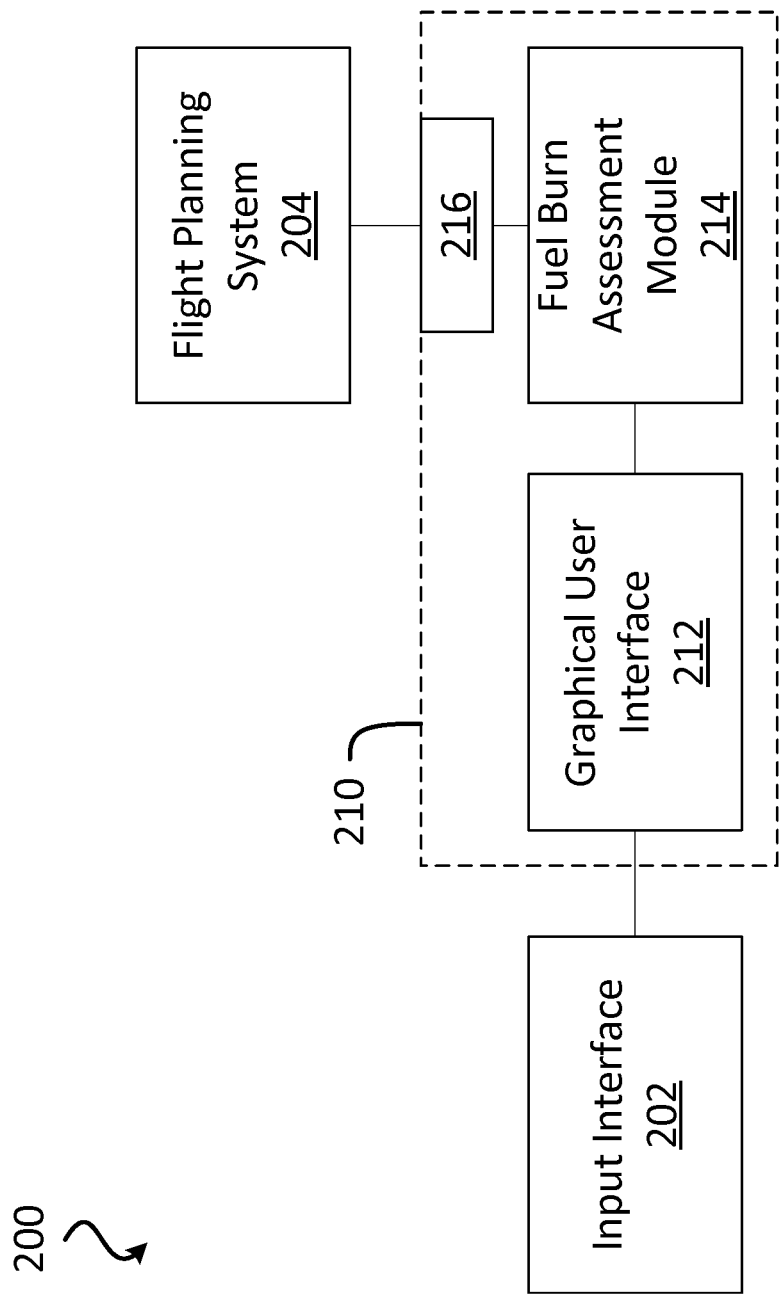
FIG. 2 is a block diagram of an example implementation of the example control system of FIG. 1.

With reference to FIG. 2, the control system 200 includes an input interface 202, a flight planning system 204, and a fuel burn module 210. The fuel burn module 210 is composed of a graphical user interface (GUI) 212, a fuel burn assessment module 214, and an output interface 216. The input interface 202 is communicatively coupled to the fuel burn module 210, and more specifically to the GUI 212. The fuel burn module 210, and more specifically the output interface 216, is communicatively coupled to the flight planning system 204.

The input interface 202 is configured for obtaining various inputs, for example from flight operations personnel for the aircraft 100. In some embodiments, the input interface 202 includes one or more of a keyboard, mouse, touchscreen or other touch-sensitive panel, a voice input system (for instance, including a microphone and a voice recognition module), and the like. The input interface 202 is communicatively coupled to the fuel burn module 210 for providing the inputs to the fuel burn module 210. In some embodiments, the input interface 202 collaborates with the GUI 212 to obtain flight information relating to a planned mission for the aircraft 100, as described hereinbelow. In some other embodiments, the input interface 202 is integrated with the GUI 212. For example, the input interface 202 is a touchscreen, and the GUI 212 is displayed on the touchscreen.

The fuel burn module 210 is configured for using the flight information to assess a fuel burn level of the aircraft 100 for the planned mission. By improving the assessment of the fuel burn level, the fuel burn module 210 can reduce the amount of fuel wasted or improperly loaded onto the aircraft 100 due to the use of too-broad assumptions about the planned mission.

The GUI 212 of the fuel burn module 210 is configured for obtaining flight information relating to the planned mission. The GUI 212 can present a variety of entry elements, including fields, buttons, for instance radio buttons, sliders, menus, for instance drop-down menus, tabs, and the like, via which flight operations personnel for the aircraft 100 can input flight information. The GUI 212 is configured for obtaining flight information including a configurable number of passengers for the aircraft 100, which that relates to a number of passengers for the planned mission. In some embodiments, the configurable number of passengers can be an actual number of passengers onboard the aircraft 100 or a number of passengers expected to be onboard the aircraft, for example based on a number of booked passengers, a number of checked-in passengers, a particular seating configuration for the aircraft, and the like. In some embodiments, the configurable number of passengers is estimated based on a number of booked or checked-in passengers, for example by applying a particular factor to the number of booked or checked passengers. In some other embodiments, the configurable number of passengers is associated with a particular seating capacity or configuration for the aircraft 100. For example, a particular aircraft model may be fitted one of a variety of different seating configurations, each having the capacity to seat a different maximum number of passengers. The configurable number of passengers can be provided or estimated based on the specific configuration of the aircraft 100. The configurable number of passengers can be any suitable measure of an anticipated, expected, or actual number of passengers for the planned mission and/or onboard the aircraft 100, and can be variable and configurable in any suitable fashion.

In some embodiments, the configurable number of passengers is expressed as an absolute number, which can be entered via a text field, slider, or other suitable entry element in the GUI 212. In other embodiments, the input passenger information is expressed as percentage to which the aircraft 100 is filled to capacity. In still other embodiments, the input passenger information is expressed as a ratio of filled seats to empty seats, or vice-versa. In some other embodiments, the input passenger information can be expressed as a selected number chosen from a drop-down box having a plurality of possible numbers. The choice of numbers in the drop down box may be associated with a seating configuration for the aircraft 100, or may be associated with a model of the aircraft 100. Irrespective of the particular method of entry, the configurable number of passengers is specified via a numeral entry element which is configured for being provided with a particular number. Still other approaches for expressing the input passenger information are considered.

In some embodiments, the GUI 212 is also configured for obtaining additional flight information. The additional flight information can include a cargo heat status indicator, which specifies whether the heating functionality in a cargo bay of the aircraft 100 is actuated. In some instances, the cargo heat status indicator also specifies a level for the heating functionality in the cargo bay.

The additional flight information can alternatively, or in addition, include a lighting status indicator, which specifies whether lighting systems in a cabin portion of the aircraft 100 is actuated. In some instances, the lighting status indicator also specifies a level to which the lighting systems in the cabin portion of the aircraft 100 is actuated.

The additional flight information can alternatively, or in addition, include an in-flight entertainment status indicator, which specifies whether in-flight entertainment in the cabin portion of the aircraft 100 is actuated. In some instances, the in-flight entertainment status indicator also specifies which types of in-flight entertainment are actuated, or a degree to which the in-flight entertainment in the cabin portion of the aircraft 100 is actuated.

The additional flight information can alternatively, or in addition, include an antenna status indicator, which specifies whether an antenna, for example used to provide in-flight WiFi, is actuated. In some instances, the antenna status indicator also specifies a model or type of the antenna (such as Ka-band vs. Ku-band), an operating mode of the antenna, and the like. Other types of antenna, for example for use in satellite radio, satellite phone service, and the like, are also considered.

The additional flight information can alternatively, or in addition, include a galley status indicator, which specifies whether a galley of the aircraft (area where food and/or beverage is prepared) is actuated. The galley can include one or more coffee makers, refrigerators, ovens, and the like, and in some embodiments the galley status indicator also specifies which elements of the galley are actuated, whether the galley is a high-energy galley or a low-energy galley, and/or a level to which the galley is actuated, for example based on which elements of the galley are actuated. In some embodiments, the galley status indicator includes a temporal breakdown indicating portions of the planned mission during which the galley will be operating in a high-energy mode or in a low-energy mode.

The GUI 212 is thus configured for acquiring input passenger information, and/or optional additional flight information (collectively 'flight information'), as detailed hereinabove. The additional flight information obtained via the GUI 212 can be acquired using any suitable entry elements, including fields, buttons, sliders, menus, drop-down boxes, tabs, and the like. The GUI 212 can also be used to collect other forms of additional flight information, as appropriate. The GUI 212 is configured for providing the flight information to the fuel burn assessment module 214.

The fuel burn assessment module 214 thus obtains the flight information, including the configurable number of passengers and/or any additional flight information, from the GUI 212. The fuel burn assessment module 214 is configured for determining a requisite engine bleed level for the planned mission based on the flight information. The requisite engine bleed level is indicative of an amount of air extracted from the engines 150 of the aircraft 100, called "bleed air". Bleed air may be expressed, for example, as an amount of air extracted every second, every minute, every hour, and the like. The bleed air can be used, for example, to perform climate control for the cockpit 120 and the cabin portion of the aircraft 100, or other portions of the aircraft 100. Because various interior climate conditions, such as temperature, humidity, and the like, within the aircraft 100 will vary with the actual number of passengers onboard the aircraft 100, the amount of bleed air required from the engines 150 of the aircraft 100 will also vary with the number of passengers.

In embodiments where the GUI 212 also collects additional flight information, the fuel burn assessment module 214 is further configured to use the additional flight information to determine the requisite engine bleed level. For example, the fuel burn assessment module 214 is configured to determine the requisite engine bleed level also based on the cargo heat status indicator. Since bleed air is used to provide the heating for the cargo hold, the fuel burn assessment module 214 uses the cargo heat status indicator to further determine the requisite engine bleed level. For example, the requisite engine bleed level for a certain number of passengers will be higher if the cargo heat status indicator specifies that the heating functionality in the cargo bay of the aircraft 100 is actuated than if the cargo heat status indicator specifies that the heating functionality is not actuated.

Moreover, the fuel burn assessment module 214 is further configured to use the additional flight information to determine an electrical load for the planned mission of the aircraft 100. The electrical load is a measure of the amount of energy extracted from the engines 150 of the aircraft 100 for use in powering various electrical systems of the aircraft 100. For example, a portion of the energy produced by the engines 150 is used to power an alternator or other electricity-production system, which produces electricity for use onboard the aircraft 100. The various electrical systems can include lighting systems, in-flight entertainment systems, antennas for use in providing in-flight WiFi or other types of connectivity, and the galley of the aircraft 100. In some embodiments, the additional flight information includes levels and/or modes of operation for each of the lighting systems, in-flight entertainment systems, antennas, and galley, and the electrical load is determined based on the levels and/or modes. In some other embodiments, the additional flight information specifies a model for the antenna, since different antenna models can exert different electrical loads.

The fuel burn assessment module 214 is also configured for assessing a fuel burn level based on the requisite engine bleed level, and optionally based on the electrical load, in embodiments where relevant additional flight information is provided. In some embodiments, assessing the fuel burn level comprises adjusting a baseline fuel burn level, which can be based on a particular set of base assumptions for the fuel burn level for the aircraft 100 performing the planned mission. For example, if the baseline fuel burn level is an absolute minimum fuel burn level, the fuel burn assessment module 214 is configured for assessing the fuel burn level based on the requisite engine bleed level and, in certain embodiments, based on the electrical load, and can adjust the baseline fuel burn level upwards. In another example, the baseline fuel burn level is a worst-case scenario fuel burn level, and the fuel burn assessment module 214 is configured for assessing the fuel burn level based on the requisite engine bleed level and, optionally, based on the electrical load, and can adjust the baseline fuel burn level downwards. In still further embodiments, the baseline fuel burn level is assessed based on an absolute calculation of the fuel burn level given the requisite engine bleed level and, optionally, the electrical load. For example, the baseline may be an arbitrary value based on a predetermined set of assumptions, which can be adjusted upwards or downwards, as appropriate. Still other embodiments are considered.

The fuel burn assessment module 214 is thus configured to obtain a more accurate assessment of the fuel burn level for the planned mission of the aircraft 100 using the requisite engine bleed level and the electrical load (where applicable), which are based on the flight information. In some embodiments, the fuel burn assessment module 214 is also configured for assessing the fuel burn level based on a supplementary drag factor associated with the antenna used with the aircraft 100. Since the antenna, which can be used to provide in-flight WiFi or other connectivity, alters the drag characteristic of the aircraft 100, the presence of the antenna can increase the amount of fuel required for the planned mission. Therefore, in some embodiments the fuel burn level is further assessed based on the supplementary drag factor associated with the antenna. It should be noted that the baseline fuel burn level can be based on assumptions for fuel burn which include, or which do not include, the antenna.

The fuel burn module 210 also includes the output interface 216 which can be used to provide the fuel burn level and any other relevant information to an external element, for example the flight-planning system 204. The output interface 216 can communicate with external elements in any suitable fashion and using any suitable protocols and methods of communication.

The flight planning system 204 is configured for developing flight plans to instruct flight operations personnel on how to best perform the planned mission. The flight planning system can establish an optimal route, for example in accordance with flight regulations, consider various weather patterns, and the like. The flight planning system 204 is also configured for obtaining the fuel burn level from the fuel burn module 210, and more specifically from the output interface 216. The flight planning system 204 can then determine an amount of fuel required to complete the planned mission based on the fuel burn level. In some embodiments, the flight planning system 204 provides instructions to flight operations personnel for the aircraft 100 regarding the fueling of the aircraft 100.

By obtaining a more accurate assessment of the fuel burn level of the aircraft for the planned mission, based on the flight information received via the GUI 212, the fuel burn module 210 can assist in reducing or minimizing fuel waste which occurs as a result of too-conservative flight information. In this fashion, the fuel burn module 210, and more generally the control system 200, can assist aircraft flight operations personnel to reduce costs and environmental impacts associated with flight missions undertaken by the aircraft 100. In some cases, the improved fuel burn level assessment can also assist in increasing revenue, for example by replacing fuel weight with additional freight or passengers, in increasing a flight range for the aircraft 100, and the like.

Figure 3:
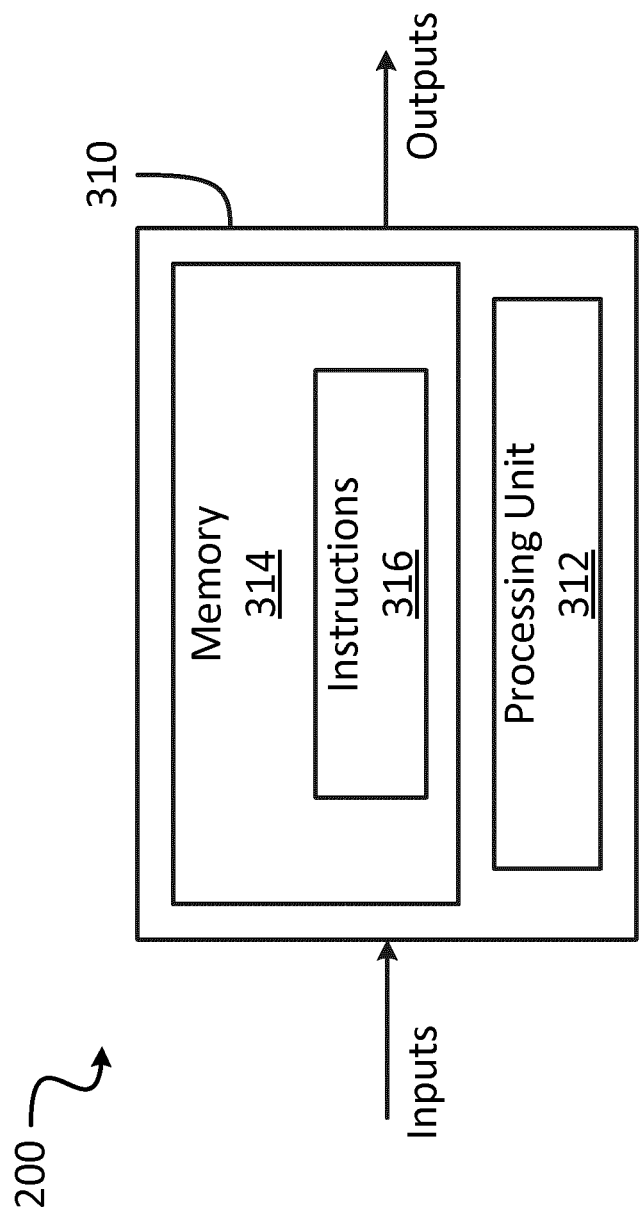
FIG. 3 is a block diagram of an example computing system for implementing the example control system of FIGS. 1 and 2.

With reference to FIG. 3, the control system 200 can comprise a computing device 310, comprising a processing unit 312 and a memory 314 which has stored therein computer-executable instructions 316. The processing unit 312 can comprise any suitable devices configured to cause a series of steps to be performed so as to implement the control system 200 such that instructions 316, when executed by the computing device 310 or other programmable apparatus, can cause the functions/acts/steps specified in the methods described herein to be executed. The processing unit 312 can comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 314 can comprise any suitable known or other machine-readable storage medium. The memory 314 can comprise non-transitory computer readable storage medium such as, for example, but not limited to, an electronic, magnetic, optical, electromagnetic, infrared, or semiconductor system, apparatus, or device, or any suitable combination of the foregoing. The memory 314 can include a suitable combination of any type of computer memory that is located either internally or externally to device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory 314 can comprise any storage means (e.g., devices) suitable for retrievably storing the computer-executable instructions 316 executable by processing unit 312.

Figure 4:
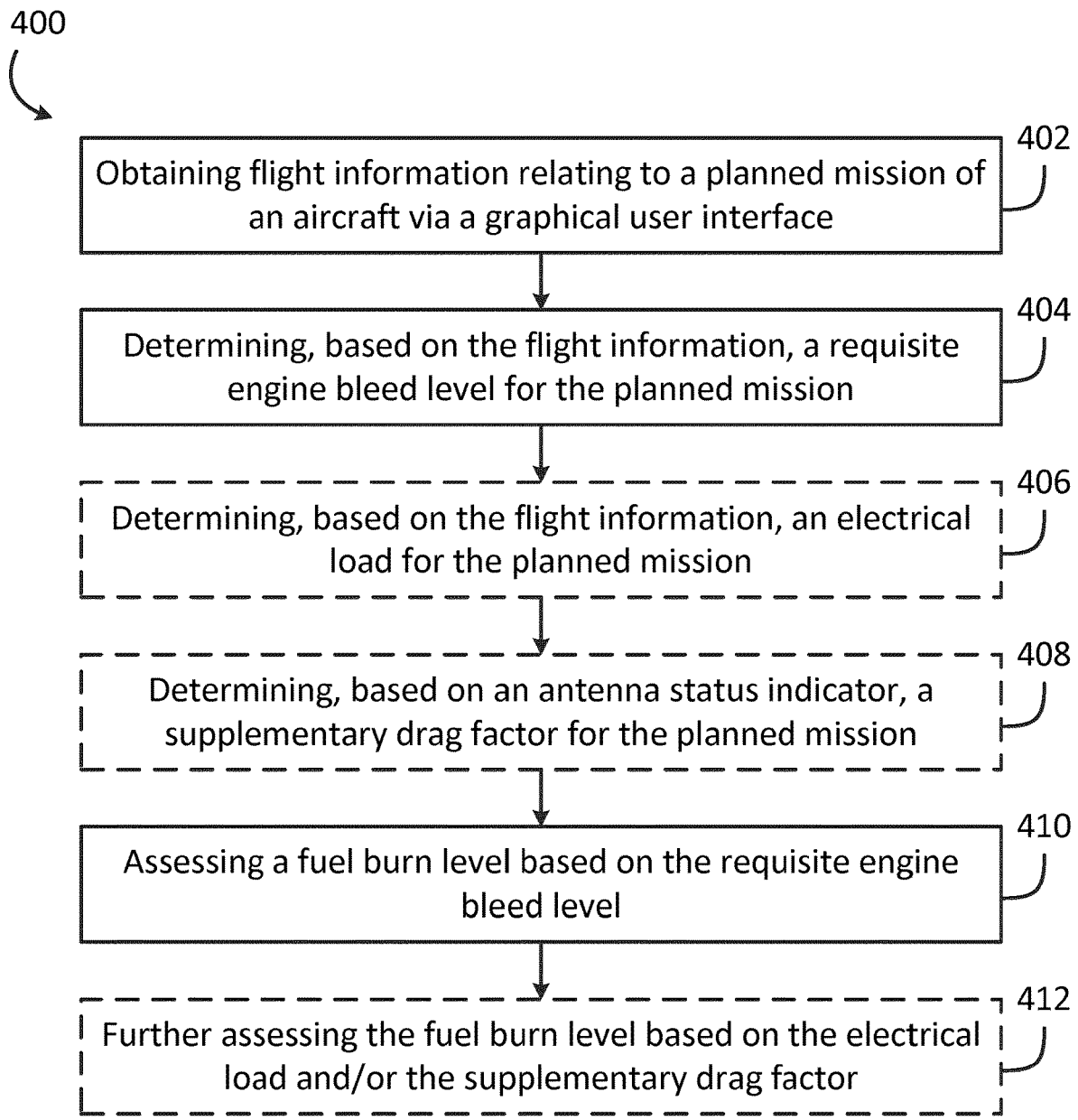
FIG. 4 is a flowchart illustrating an example method for assessing a fuel burn level of an aircraft for a planned mission, in accordance with an embodiment.

With reference to FIG. 4, there is illustrated a method 400 for assessing a fuel burn level of an aircraft, for example the aircraft 100, for a planned mission. At step 402, flight information relating to the planned mission of the aircraft 100 is obtained via a graphical user interface, for example the GUI 212. The flight information includes configurable number of passengers, and optionally additional flight information, for example a cargo heat status indicator, a lighting status indicator, an in-flight entertainment status indicator, an antenna status indicator, a galley status indicator, and the like. The GUI 212 uses a numeral entry element to obtain the configurable number of passengers, for example a text entry field, a slider, a scrollable element, and the like. The GUI 212 may use any suitable type of status indicator entry elements to obtain the additional flight information, including drop-down menus, radio buttons, and the like.

At step 404, a requisite engine bleed level for the planned mission is determined based on the flight information. In some embodiments, the requisite engine bleed level is determined based on the configurable number of passengers. In other embodiments, the requisite engine bleed level is also determined based on the cargo heat status indicator. Any suitable algorithm and/or calculations can be used to determine the requisite engine bleed level.

At step 406, optionally an electrical load for the planned mission is determined based on the flight information. For example, the lighting status indicator, the in-flight entertainment status indicator, the antenna status indicator, and/or the galley status indicator are used to determine the electrical load for the planned mission. Any suitable algorithm and/or calculations can be used to determine the electrical load for the planned mission.

At step 408, optionally a supplementary drag factor for the planned mission is determined based on the antenna status indicator. In some embodiments, the antenna status indicator includes a model of the antenna being used. Any suitable algorithm and/or calculations can be used to determine the supplementary drag factor based on the antenna model.

At step 410, a fuel burn level is assessed based on the requisite engine bleed level. In some embodiments, assessing the fuel burn level is done by adjusting a baseline fuel burn level, which can be a worst-case scenario, a best case scenario, an average scenario, or any other suitable baseline, which can be adjusted based on the requisite engine bleed level. It should be noted that in some embodiments, the baseline fuel burn level can be an arbitrary baseline, or a null baseline, and at step 410 an actual fuel burn level is calculated based on the requisite engine bleed level.

At step 412, optionally the baseline fuel burn level can be further assessed based on the electrical load, determined at optional step 406, and/or based on the supplementary drag factor, determined at optional step 408. In some embodiments, steps 410 and 412 can be performed substantially simultaneously, for example as part of a common set of algorithms and/or calculations.

In some embodiments, the method 400 can be performed iteratively. For example, the method 400 can first be performed based on a first set of flight information, which uses configurable number of passengers based on a number of checked-in passengers. Thereafter, for example closer to a departure time for the aircraft 100 on the planned mission, a second set of flight information, which uses configurable number of passengers representative of a number of passengers onboard the aircraft, is used to perform the method 400 and obtain a more accurate fuel burn level.

It should also be noted that although the foregoing description has described the methods and systems disclosed herein as first obtaining the configurable number of passengers, and then obtaining additional flight information, which can relate to heating functionality in a cargo bay, lighting systems, in-flight entertainment systems, an antenna, and/or a galley, other combinations and/or permutations of this information is also considered. For example, the flight information can include any one or more of the configurable number of passengers, the cargo heat status indicator, the lighting status indicator, the in-flight entertainment status indicator, the antenna status indicator, and the galley status indicator, as appropriate.

Figure 5A:
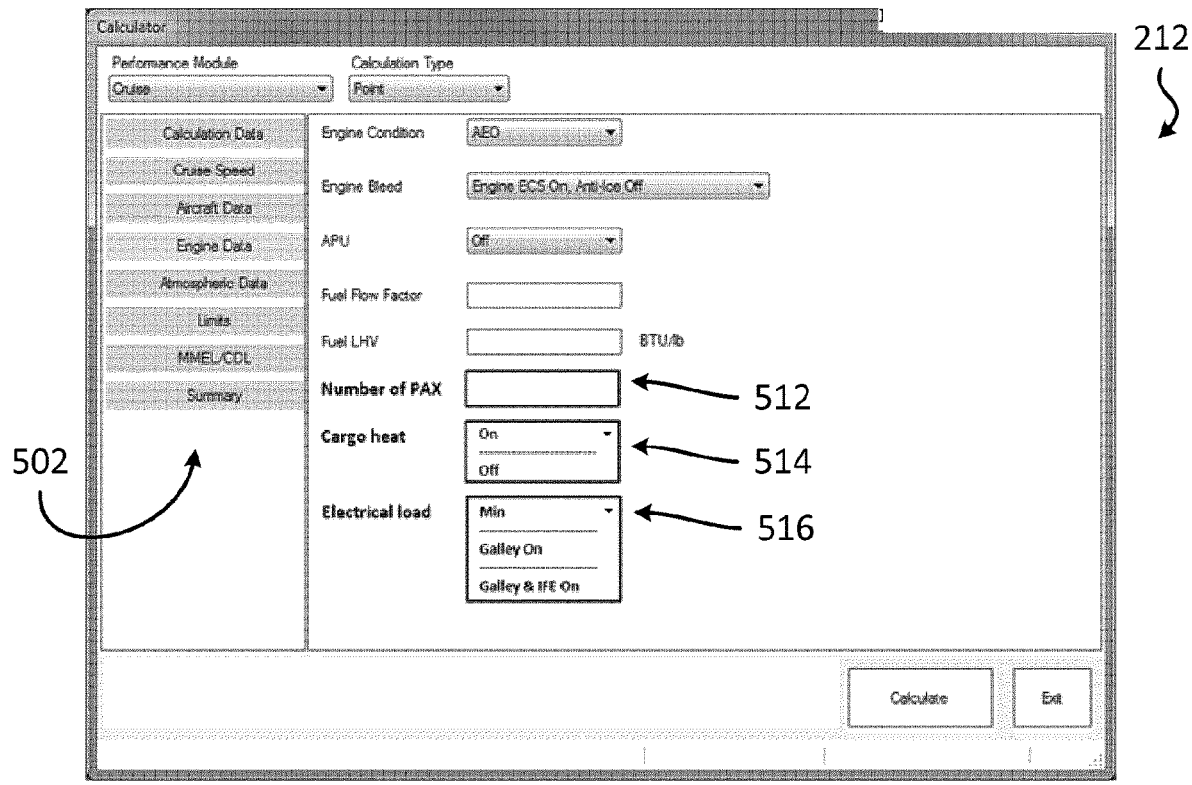
FIGS. 5A-B are screenshots of an example graphical user interface used as part of the system of FIGS. 1 and 2.
Figure 5B:
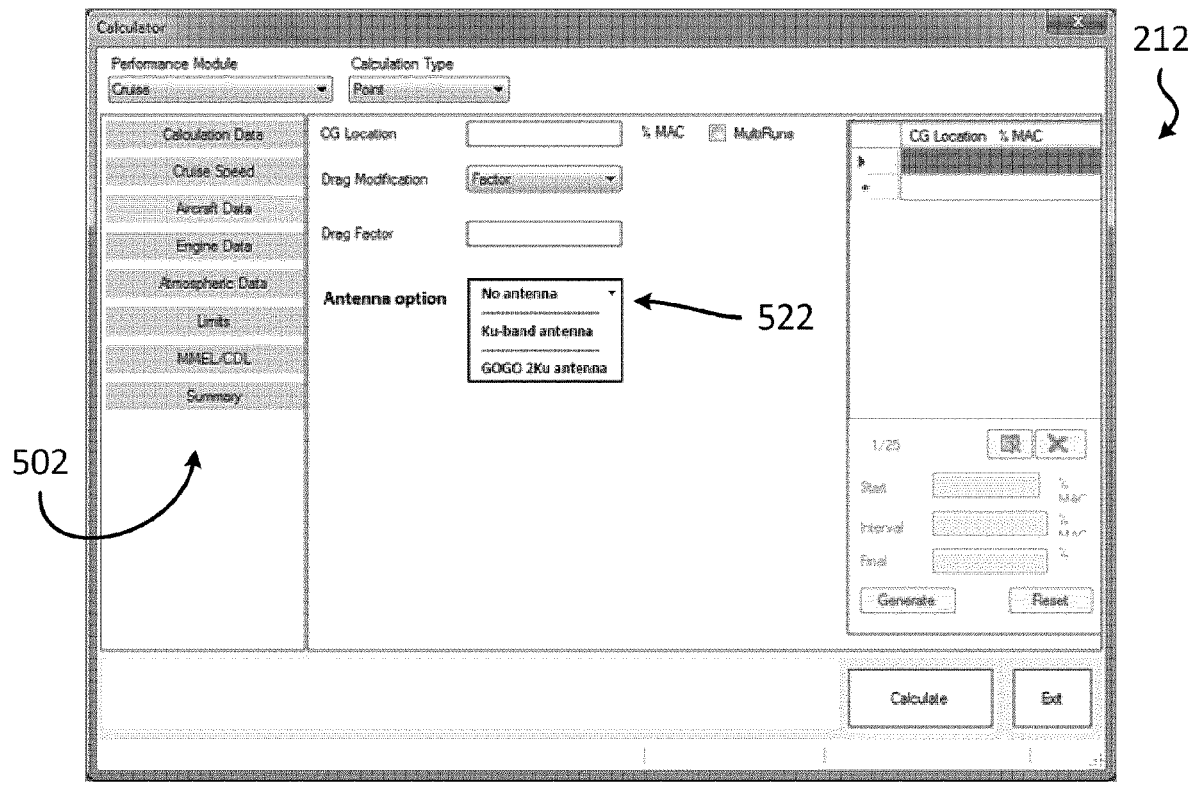

With reference to FIGS. 5A and 5B, example screenshots of an implementation of the GUI 212 are provided. The GUI 212 comprises a tab menu 502, which has various elements which can be actuated to display different tabs of the GUI 212. In FIG. 5A, an "Engine Data" tab is selected in the tab menu 502. A numeral entry element is illustrated as a text entry field 512, located in a first portion of the GUI 212, in which flight operations personnel for the aircraft 100 can input configurable number of passengers. In other implementations, the numeral entry element can be a slider, a scrollable menu, or any other suitable form of numeral entry element.

The "Engine Data" tab of the GUI 212 also includes a pair of status indicator entry elements, which can be located in a second, separate portion of the GUI 212. A first status indicator entry element is illustrated as a drop-down menu 514 by which flight operations personnel for the aircraft 100 can select a cargo heat status indicator. A second status indicator entry element is illustrated as a drop-down menu 516 by which flight operations personnel for the aircraft 100 can select an electrical load status indicator. In this embodiment, the electrical load status indicator can be used to indicate whether the electrical load will be at a minimum level ("Min"), whether the galley will be actuated ("Galley On"), or whether the galley and in-flight entertainment will be actuated ("Galley & IFE On"). In other implementations, the drop-down menus 514, 516 can be implemented as a series of radio buttons, or in any other suitable fashion. In addition, the drop-down menu 516, which indicates the electrical load for the planned mission of the aircraft 100, can be provided with more or fewer options, as appropriate. In some other embodiments, separate drop-down menus can be provided for the lighting status indicator and the in-flight entertainment status indicator.

In FIG. 5B, an "Aircraft Data" tab of the tab menu 502 is selected. On this tab, the GUI 212 includes a third status indicator entry element, illustrated as a drop-down menu 522, by which flight operations personnel for the aircraft 100 can select an antenna status indicator. In this embodiment, the antenna status indicator can be used to indicate whether no antenna is used ("No antenna"), or alternatively the model of the antenna used for the planned mission of the aircraft 100 ("Ku-band antenna" or "GOGO™ 2 Ku antenna").

The GUI 212 also contains other GUI elements, which can be numeral entry element, status indicator entry elements, and the like, for obtaining additional flight information from flight operations personnel for the aircraft 100. Additional embodiments of the GUI 212, including such other GUI elements, are also considered.

The methods and systems for assessing a fuel burn level of an aircraft for a planned mission described herein may be implemented in a high-level procedural or object-oriented programming or scripting language, or a combination thereof, to communicate with or assist in the operation of a computer system, for example the computing device 310. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the at least one processing unit 312 of the computer 310, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems disclosed herein, as well the aircraft itself implementing various aspects of the methods and systems disclosed herein, may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assessing a fuel burn level of an aircraft for a planned mission, comprising:
   obtaining flight information relating to the planned mission via a graphical user interface, the flight information comprising a configurable number of passengers for the aircraft;
   determining, based on the flight information, a requisite engine bleed level for the planned mission;
   assessing a fuel burn level based on the requisite engine bleed level for the planned mission;
   determining, based on the fuel burn level, an amount of fuel required to complete the planned mission.

2. The method of claim 1, wherein the flight information further comprises a cargo heat status indicator, and wherein determining the requisite engine bleed level is further based on the cargo heat status indicator.

3. The method of claim 1, wherein the flight information further comprises an in-flight entertainment status indicator, further comprising determining, based on the in-flight entertainment status indicator, an electrical load for the planned mission, and wherein assessing the fuel burn level is further based on the electrical load.

4. The method of claim 3, wherein the flight information further comprises a lighting status indicator, and wherein determining the electrical load is further based on the lighting status indicator.

5. The method of claim 3, wherein the flight information further comprises an antenna status indicator, further comprising determining, based on the antenna status indicator, a supplementary drag factor, and wherein assessing the fuel burn level is further based on the supplementary drag factor.

6. The method of claim 3, wherein the flight information further comprises a galley status indicator, and wherein determining the electrical load is further based on the galley status indicator.

7. The method of claim 6, wherein the galley status indicator is indicative of a galley of the aircraft being one of high-energy and low-energy.

8. The method of claim 1, wherein obtaining flight information via the graphical user interface comprises receiving an input via at least one entry element of the graphical user interface.

9. The method of claim 1, wherein obtaining flight information comprising the configurable number of passengers for the aircraft comprises obtaining a number of passengers onboard the aircraft.

10. The method of claim 1, wherein obtaining flight information comprising the configurable number of passengers for the aircraft comprises estimating a number of passengers based on one of a number of booked passengers and a number of checked-in passengers.

11. The method of claim 1, wherein obtaining flight information comprising the configurable number of passengers for the aircraft comprises providing a number of passengers based on one of a seating configuration and a model of the aircraft.

12. A system for assessing a fuel burn level of an aircraft for a planned mission, comprising:
   a processing unit; and
   a non-transitory computer-readable medium communicatively coupled to the processing unit and comprising computer-readable program instructions executable by the processing unit for:
      obtaining flight information relating to the planned mission via a graphical user interface, the flight information comprising a configurable number of passengers for the aircraft;
      determining, based on the flight information, a requisite engine bleed level for the planned mission;
      assessing a fuel burn level based on the requisite engine bleed level for the planned mission;
      determining, based on the fuel burn level, an amount of fuel required to complete the planned mission.

13. The system of claim 12, wherein the flight information further comprises a cargo heat status indicator, and wherein determining the requisite engine bleed level is further based on the cargo heat status indicator.

14. The system of claim 12, wherein the flight information further comprises an in-flight entertainment status indicator, the program instructions being further executable for determining, based on the in-flight entertainment status indicator, an electrical load for the planned mission, and wherein assessing the fuel burn level is further based on the electrical load.

15. The system of claim 14, wherein the flight information further comprises a lighting status indicator, and wherein determining the electrical load is further based on the lighting status indicator.

16. The system of claim 14, wherein the flight information further comprises an antenna status indicator, the program instructions being further executable for determining, based on the antenna status indicator, a supplementary drag factor, and wherein assessing the fuel burn level is further based on the supplementary drag factor.

17. The system of claim 16, wherein determining the electrical load is further based on the antenna status indicator.

18. The system of claim 14, wherein the flight information further comprises a galley status indicator, and wherein determining the electrical load is further based on the galley status indicator.

19. The system of claim 18, wherein the galley status indicator is indicative of a galley of the aircraft being one of high-energy and low-energy.

20. The system of claim 12, wherein obtaining flight information via the graphical user interface comprises receiving an input via at least one entry element of the graphical user interface.

* * * * *